United States Patent [19]
Talmo et al.

[11] 3,775,839
[45] Dec. 4, 1973

[54] METHOD OF MAKING A TRANSDUCER

[75] Inventors: Robert Eugene Talmo, Pasadena;
Edward R. Brady, Sierra Madre, both of Calif.

[73] Assignee: International Telephone and Telegraph Corporation, New York, N.Y.

[22] Filed: Mar. 27, 1972

[21] Appl. No.: 238,070

[52] U.S. Cl.................. 29/595, 29/472.9, 29/610, 73/88.5 SD, 73/398 AR
[51] Int. Cl............................................. G01r 3/00
[58] Field of Search.................... 29/595, 585, 584, 29/610 SG, 472.9; 65/59; 73/398 AR, 88.5 SD

[56] References Cited
UNITED STATES PATENTS

| | | | |
|---|---|---|---|
| 3,397,278 | 8/1968 | Pomerantz | 174/52 |
| 3,714,706 | 2/1973 | Reizman | 29/624 |
| 3,256,598 | 6/1966 | Kramer | 29/484 |
| 3,697,917 | 10/1972 | Orth | 73/398 AR |

Primary Examiner—Richard J. Herbst
Assistant Examiner—Robert M. Rogers
Attorney—C. Cornell Remsen, Jr. et al.

[57] ABSTRACT

A method of making a strain gage transducer including the steps of fusing a glass sheet to each side of a metal cantilever beam in an inert gas, lapping the fused sheet, and bonding a silicon strain gage to each sheet by heating and simultaneously applying a positive potential to each gage relative to the potential of each corresponding sheet. Thin sheets may be employed, whereby breakage due to differential thermal expansion may be eliminated. The fusion step also is advantageous because the glass is firmly bonded to the beam. This means that the beam reinforces the fused sheets. They can, therefore, easily be lapped without fear of breakage.

11 Claims, 5 Drawing Figures

METHOD OF MAKING A TRANSDUCER

BACKGROUND OF THE INVENTION

This invention relates to the transducer art, and more particularly, to glass bonding a semiconductor strain gage to a metal leaf spring cantilever beam.

In the past it has been the practice to bond two strain gages to the opposite sides of a cantilever beam to obtain an output voltage or current from a circuit including Wheatstone bridge. The strain gages are thus connected as two legs of the bridge. For example, the output voltage may be employed with a voltmeter appropriately calibrated to indicate differential pressure. For example, see U.S. Pat. No. 3,343,420. The output may also be used for process control or for any other purpose.

It has been difficult to bond the strain gages to the beam with more conventional bonding agents. Glass, as a bonding agent, breaks due to differential thermal expansion. If it is thin, it is difficult to manage without breakage. Further, it should be flat and smooth to bond with the processes disclosed in U.S. Pat. No. 3,397,278 and U.S. Pat. No. 3,417,459.

SUMMARY OF THE INVENTION

In accordance with the method of the present invention, the above-described and other disadvantages of the prior art are overcome by fusing a thin glass sheet to a leaf spring cantilever beam, and bonding a strain gage thereto by heating all three and passing a D.C. electric current from gage to glass while the three are heated.

It is an outstanding advantage of the invention that the glass sheet can be very easily lapped to make it flat and smooth before the gage is bonded thereto, the beam to which it is bonded serving as a reinforcement during lapping. Lapping can thus be performed much more easily and without breakage.

Another feature of the invention resides in the fact that the gage is the most expensive part of the assembly. Thus, if the gage is glass bonded first, and the glass-to-beam bond fails, the gage is irretrievably lost. Thus, by bonding the glass to the beam first, a good bond therebetween can be determined by inspection, and a gage is never lost because of a poor glass-to-beam bond.

It is still another advantage of the present invention that the fusing step is less difficult than the steps used to bond the gage to the glass.

A further advantage of the invention is that the fusion bond is stronger than the gage-to-glass bond.

A feature of the invention resides in the application of pressure at only one point of a strain gage during bonding. This produces a more uniform bond.

Carbon pressure blocks also improve glass bonding.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENT

Figure 1:
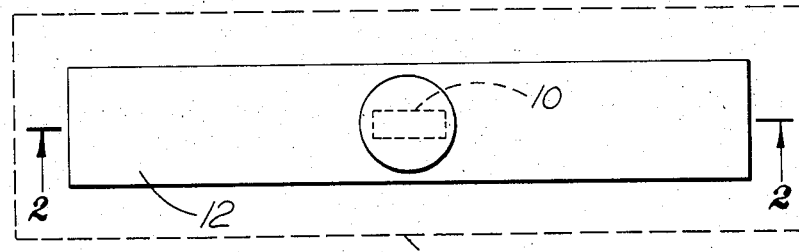
FIG. 1 is a top plan view of a partial assembly of a transducer diagrammatically illustrated in an oven purged with an inert gas such as argon.
Figure 2:
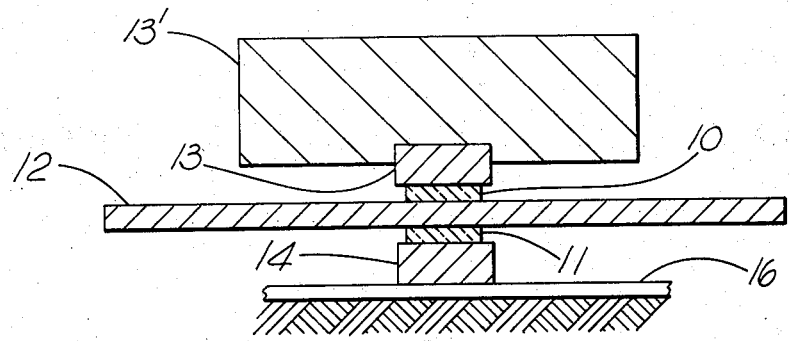
FIG. 2 is a longitudinal sectional view of the partial assembly taken on the line 2—2 shown in FIG. 1.

As shown in FIGS. 1 and 2, rectangular sheets of glass 10 and 11 are held against a leaf spring cantilever beam 12 between carbon blocks 13 and 14, respectively.

All of the structures just described are supported in an argon purged oven 15 by a support 16 fixed thereto therein.

The structure shown in FIGS. 1 and 2 illustrates a fusion step of the method of the present invention. Preferably, beam 12 has a thermal co-efficient of expansion which is equal to or close to the thermal coefficient of expansion of sheets 10 and 11. Oven 15 is heated to a temperature which may be approximately equal to the softening temperature of sheets 10 and 11. Some softening is anticipated. Preferably, sheets 10 and 11 are made of Corning 7740 Pyrex glass. Preferably, beam 12 is made of a material sold under the trade name Kovar. It may have a composition of, for example, 29 percent nickel, 17 percent cobalt, 0.5 percent manganese (maximum), 0.2 percent silicon, other materials, if desired, most probably in amounts much less than 1 percent, and the balance iron.

Preferably, each of the sheets 10 and 11 have the same thickness. Preferably, this thickness is less than 2 mils, and more preferably, 1 mil.

Some of the members shown in the drawings have been shown with a greatly enlarged size for clarity. For example, sheets 10 and 11 may have identical dimensions, if desired. If so, each of the sheets 10 and 11 may be one-tenth inch wide and one-eighth inch long. Carbon blocks 13 and 14 may have a size and shape relative to sheets 10 and 11, as shown in FIGS. 1 and 2. They are preferably made of pyrolytic graphite.

The weight of block 13 and a weight 13' on sheet 10 and the weight of block 13, weight 13', sheet 10 and beam 12 on sheet 11 provide a substantial advantage. The pressure so created improves the strengths of the bonds of sheets 10 and 11 to beam 12.

When Corning 7740 is used, preferably the oven 15 is raised to a temperature of 1,500° F. for a period of about 10 minutes. The assembly shown in FIG. 2 is then allowed to cool. The upper surface of sheet 10 is then lapped. The lower surface of sheet 11 is then lapped. Preferably, after lapping, each of the sheets 10 and 11 has a smooth finish of 2.0 mirco inch rms. and a flatness of 20 millionths of 1 inch per inch.

Weight 13' is not shown in FIG. 1 for clarity.

Figure 3:
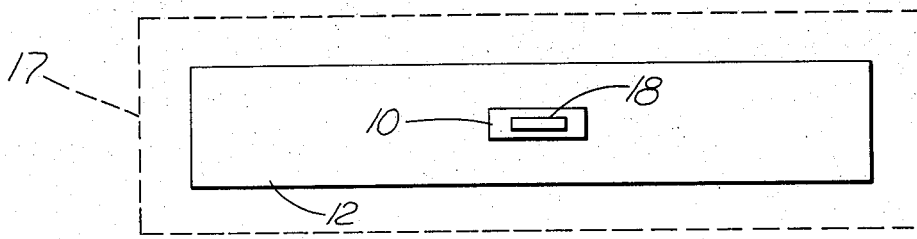
FIG. 3 is a top plan view of a transducer assembly schematically illustrated in an oven.

After lapping, the assembly of FIG. 2 is placed in an oven 17, shown in FIG. 3, with semiconductor, preferably silicon, strain gages 18 and 19 in engagement with sheets 10 and 11, respectively. Beam 12 is supported at its ends inside oven 17.

Figure 4:
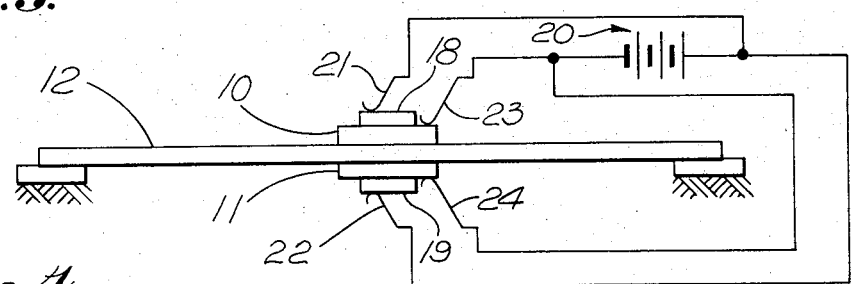
FIG. 4 is a side elevational view of the assembly shown in FIG. 3.

As shown in FIG. 4, a D.C. source of potential 20 is provided. Light spring electrodes 21 and 22 are held in engagement with strain gages 18 and 19. Similar electrodes 23 and 24 are held in engagement with the lapped surfaces of sheets 10 and 11, respectively. Both of the electrodes 23 and 24 are connected to the negative pole of the D.C. source of potential 20. Both of the electrodes 21 and 22 are connected to the positive pole of source 20. Current is supplied during heating in oven 17.

Figure 5:
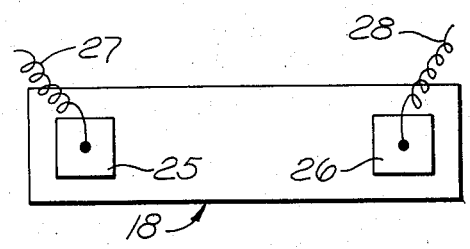
FIG. 5 is a top plan view, greatly enlarged, of a semiconductor strain gage.

As shown in FIG. 5, strain gage 18 has conventional conductive metal contacts 25 and 26 thereon to which electrical leads 27 and 28 are connected, respectively.

Note that electrodes 21 and 22 in FIG. 4 bear on one end of each of the strain gages 18 and 19, respectively. This serves two very valuable functions. In the first place, the electrode 21 is pressed upon contact 25. This provides for better contact. In addition, it has unexpectedly been found that the application of pressure at one point of a strain gage will produce a substantially better and more uniform bond.

In completing the step illustrated in FIGS. 3 and 4, the temperature of oven 17 is typically raised to about 650° F. The potential supplied by electrodes 21, 22, 23 and 24 is so supplied while the assembly shown in FIG. 4 is maintained at a temperature of, for example, 650° F. At a time before, after or during heating, source 20 may have a voltage thereacross from positive to negative pole of from 150 to 1,000 volts. Preferably, the temperature in oven 17 is from 600° F. to 1,000° F.

The difference of potential is preferably applied at least by the time the parts have reached the temperature range of 600° F. to 1,000° F. When the difference of potential is applied, the current from source 20 will immediately rise to a peak value of about 10 microamperes. It will then usually decline exponentially with time to a value equal to or less than 5.0 microamperes. It will generally take about 5 minutes for this decline. When the current has fallen after the peak to about 50 percent of the peak value, the bond between strain gages 18 and 19 and sheets 10 and 11, respectively, will have been made so that these parts may be cooled and source 20 removed.

The heating step illustrated in FIGS. 3 and 4 may be performed in air, if desired.

Strain gages 18 and 19 may be identical, if desired. Both of these strain gages are preferably of a single conductivity type. These are known as so-called "bulk" silicon strain gages. However, strain gages 18 and 19 may also be "diffused" silicon strain gages, which gages have P-N junctions. Both bulk and diffused strain gages are well known in the prior art.

All of the times, temperatures and voltages set forth herein are merely set forth by way of example, and are by no means critical.

The phrase, "inert gas," as used hereinbefore and in the claims to follow, is hereby defined to include either a single gas or a mixture of gases which do not react unfavorably with the materials placed in the oven 15. Thus, as defined herein, the phrase "inert gas" would include, but not be limited to, argon, helium and nitrogen.

What is claimed is:

1. The method of making a transducer, said method comprising the steps of: holding first and second glass sheets against opposite sides of a metal beam at the same location therealong, said beam having a thermal coefficient of expansion approximately that of said glass; heating said glass sheets and said beam in an inert gas to a temperature approximately equal to the softening temperature of the glass to cause said sheets to bond to said beam; allowing said sheets and said beam to cool to a temperature below said softening temperature; placing first and second semiconductor strain gages on said first and second sheets, respectively; placing first and second electrodes connected from one pole of a source of potential against only one point on said first and second strain gages, respectively, to hold said strain gages in engagement with the corresponding glass sheets; placing third and fourth electrodes connected from the other pole of said source against said first and second glass sheets, respectively; and heating said beam, said glass sheets and said strain gages until the combination of the heating and passing current through said strain gages and said glass sheets produces a bond therebetween.

2. The invention as defined in claim 1, wherein said glass sheets are pressed against said beam when said first heating step is performed, said inert gas being argon, said glass sheets being first heated to about 1,500° F., said glass sheets being made of Corning 7740 Pyrex glass, said beam being made of Kovar and including about 27 percent nickel, about 17 percent cobalt, about 0.5 percent manganese, about 0.2 percent silicon, and the balance iron, said glass sheets being lapped smooth and flat after they have been bonded to said beam but before they have been bonded to said strain gages, said strain gages having an electrical lead bonded to each end thereof at respective conductive contacts, said first and second electrodes being placed in engagement with conductive contacts on said first and second strain gages, respectively, during said first placing step, said strain gages being made of silicon, said heating step causing the temperature of said strain gages and said glass sheets to rise to about 650° F., said source being adapted to provide a D.C. voltage of from about 150 to about 1,000 volts, said fusion step being performed in an inert gas, said one source pole being the positive pole thereof.

3. The invention as defined in claim 1, wherein said glass sheets are lapped after they have been bonded to said beam but before said strain gages have been bonded thereto.

4. The method of making a transducer, said method comprising the steps of: fusing a sheet of glass to a metal beam having a thermal coefficient of expansion substantially the same as that of the glass; holding a semiconductor strain gage against said glass; and heating said strain gage and said glass and simultaneously applying a voltage therebetween to cause said strain gage and said glass to be bonded to each other.

5. The invention as defined in claim 4, wherein said voltage is a D.C. voltage of a polarity such that said glass is maintained negative with respect to said strain gage.

6. The invention as defined in claim 5, wherein said glass is lapped after fusing but before said strain gage is held thereagainst.

7. The invention as defined in claim 6, wherein said fusion step is performed in an inert gas.

8. The invention as defined in claim 7, wherein said voltage is maintained by connecting the output leads of a D.C. source of potential between said strain gage and said glass, one source lead being connected to said strain gage via an electrode held in pressure contact with said strain gage holding it, in turn, in pressure contact with said glass, said electrode being held against said strain gage at only one isolated point thereon.

9. The invention as defined in claim 5, wherein said voltage is maintained by connecting the output leads of a D.C. source of potential between said strain gage and said glass, one source lead being connected to said strain gage via an electrode held in pressure contact with said strain gage and holding it, in turn, in pressure contact with said glass, said electrode being held against said strain gage at only one isolated point thereon.

10. The invention as defined in claim 9, wherein said fusion step is performed in an inert gas.

11. The invention as defined in claim 5, wherein said fusion step is performed in an inert gas.

* * * * *